(No Model.)
H. A. CORLISS.
SELF HOISTING FLOOD GATE.
No. 490,137. Patented Jan. 17, 1893.
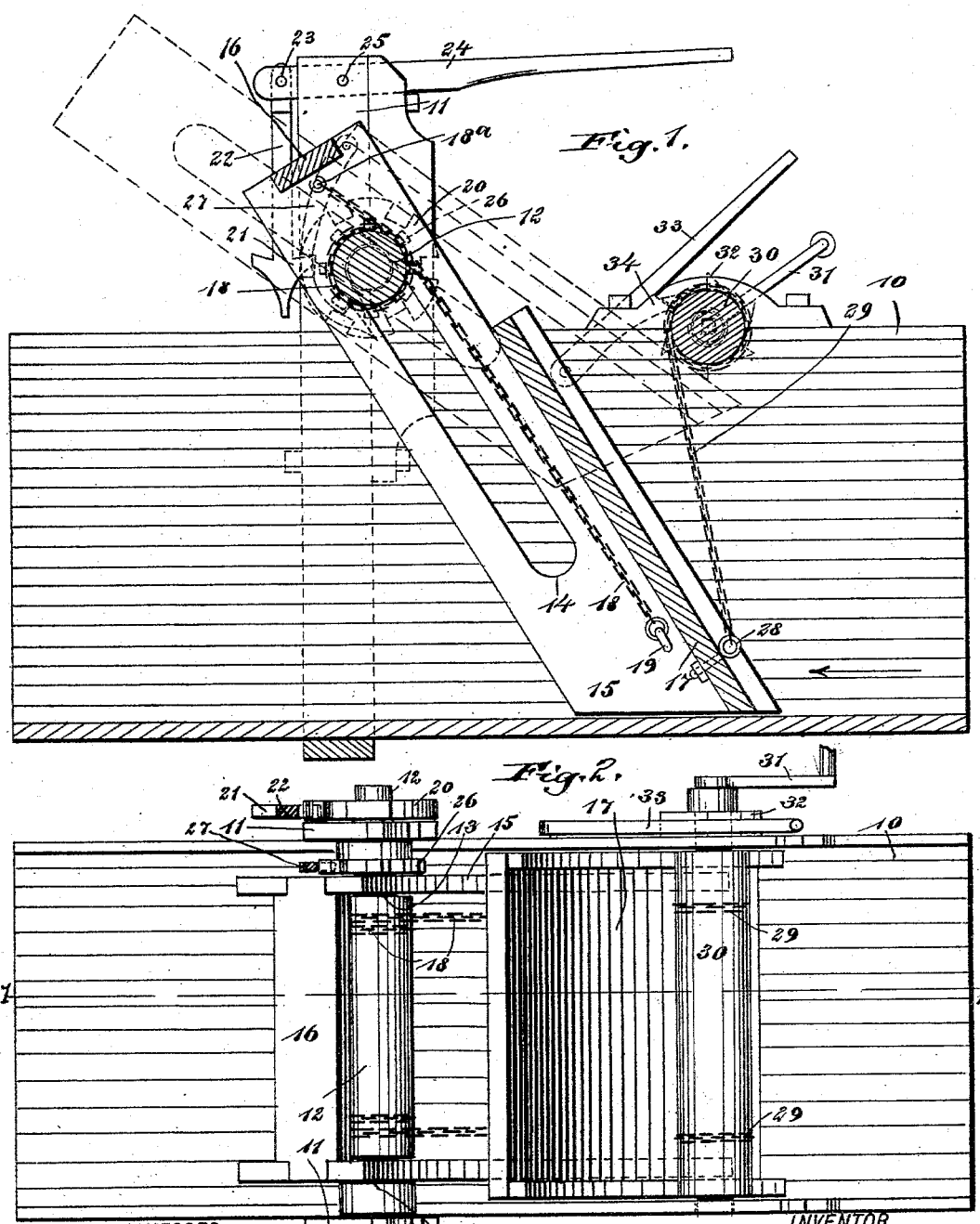
WITNESSES:
F. McArdle
C. Sedgwick
INVENTOR
H. A. Corliss
BY Munn & Co
ATTORNEYS.

UNITED STATES PATENT OFFICE.

HERBERT A. CORLISS, OF ST. HELEN, OREGON.

SELF-HOISTING FLOOD-GATE.

SPECIFICATION forming part of Letters Patent No. 490,137, dated January 17, 1893.

Application filed July 29, 1892. Serial No. 441,568. (No model.)

*To all whom it may concern:*

Be it known that I, HERBERT A. CORLISS, of St. Helen, in the county of Columbia and State of Oregon, have invented a new and Improved Self-Hoisting Flood-Gate, of which the following is a full, clear, and exact description.

My invention relates to improvements in flood gates such as are used to control the flow of water through flumes and sluiceways, and more especially to that class of flood gates which are used to control sluiceways through which logs are floated. Where the water reservoir is somewhat small, it is necessary to save as much water as possible and to flush the sluiceway or flume so that the logs may float through quickly, after which the gate is shut. With the ordinary gate this cannot be successfully done, as the gate is usually heavy, and it requires so much time to raise and lower it that a great quantity of water is wasted.

The object of my invention is to produce an extremely simple form of gate which will tightly close the flume or sluiceway, and which may be arranged so that the pressure of water upon it will lift the gate nearly or quite out of water, throwing it to a balance, and enabling it to be quickly and easily handled. By this means the stream of water is brought under perfect control, and may be turned on and shut off instantly.

To this end, my invention consists in certain features of construction and combinations of parts, which will be hereinafter described and claimed.

Reference is to be had to the accompanying drawings forming a part of this specification, in which similar figures of reference indicate corresponding parts in both views.

Figure 1 is a central vertical section on the line 1—1 in Fig. 2, of my improved gate as applied to a flume; and Fig. 2 is a sectional plan of the same.

The flume 10 is of the usual kind, the flume as shown being made of plank, although it may be made of timbers or other material, and on opposite sides of the flume are gate posts 11, upon which is journaled a roller 12, which extends transversely above the flume. The roller is reduced near the ends, as shown at 13, and this reduced portion fits in the longitudinal slots 14 of the gate timbers 15, these timbers being cut off at an incline at the bottom so as to fit snugly against the bottom of the flume. The front of the gate is composed of the usual planks 17, which are firmly secured to the timbers 15. The side pieces are also connected at the top by a cross piece 16. Secured to eye-bolts 19, near the lower end of the gate timbers 15, are chains 18, which are wound once around the roller 12, and then secured to the said timbers 15 near the top, as shown at 18ª in Fig. 1. By this arrangement the gate is held to slide upward on the roller 12, and the friction of the chains on the roller enables the gate to be controlled by the roller and also to move steadily thereon. At one end of the roller 12 is a notched wheel 20, adapted to receive the barbs of a pawl 21 which hangs against one notch of the wheel, the pawl having an elongated upwardly extending shank 22, which is pivoted as shown at 23, to the short end of a lever 24, and the latter extends in a nearly horizontal position and is fulcrumed on one of the gate posts, as shown at 25. It will be seen that by alternately pressing and raising the lever 24, the pawl 21 may be made to engage the wheel 20 notch by notch, thus turning the wheel and the roller 12 and moving the gate upward. The roller 12 is also provided with a ratchet wheel 26, which is engaged by a pawl 27 pivoted on the gate, as shown in Fig. 1, and the pawl by engaging the wheel prevents the gate from rising.

The gate is provided on the front side and near the bottom with eye-bolts 28, to which are secured chains 29, and these extend upward and are secured to a roller 30 which is journaled in boxes on the top of the flume, and the roller has at one end a crank 31 by which it may be revolved. The roller is also provided with a ratchet wheel 32. A lever 33 is pivoted on the side of the flume adjacent to the ratchet wheel, and on the lever is a tooth 34, which serves as a pawl and which is adapted to engage the ratchet wheel 32.

The operation of the gate is as follows: When in the position shown best in Fig. 1, it closes the flume 10, and the water presses it firmly to place, the pawl 27 locking the gate to the roller 12, and preventing the gate from moving. When, however, the flume is well filled and the water is to be allowed to pass, the pawl 27 is disengaged and the pressure of water against the gate causes it to slide upward, the walls of the slot 14 moving up on the roller 12, and the gate moves upward quickly so as to allow the water to escape at once. After the first movement of the gate, caused by the pressure of water, it may be moved farther if desired by the lever 24 and pawl 21, or its free ends may be lifted up, as shown by dotted lines in Fig. 1, by winding the chains 29 upon the roller 30. After the logs have passed, the lever 33 is thrown backward so as to disengage the ratchet wheel 32, the pawl 21 is also loosened from the wheel 20, and the gate will drop back to place.

In operating the gate as described above, the inclination may be fixed by adjusting the crank roller 30, and it will be noticed that the chains 29 will prevent the lower end of the gate from being carried too far down stream by the water pressure.

Having thus described my invention, I claim as new, and desire to secure by Letters Patent,—

1. The combination, with a flume or sluiceway, of a roller journaled upon the sluiceway, a sliding gate held to move upward upon the roller and adapted to be forced upward by the pressure of water against it, and a ratchet mechanism for locking the gate in place, substantially as described.

2. The combination with a flume or sluiceway, of a gate held in inclined position therein and provided with longitudinal side slots, a transverse support secured to the flume and extending through the slots, and locking mechanism to fix the position of the gate, substantially as described.

3. The combination with a flume or sluiceway, of a roller journaled upon the same, a sliding gate having side slots to fit the roller, chains secured to the upper and lower portions of the gate and extending around the roller, a ratchet mechanism to lock the roller and gate, a second crank-actuated roller journaled upon the flume in advance of the gate roller, and chains extending from the second roller to the lower portions of the gate, substantially as described.

4. The combination, with the flume and the transverse roller thereon having a notched wheel at one end, of a sliding gate held within the flume and adapted to move upon the roller, chains extending from the upper to the lower portions of the gate and around the roller, a swinging lever pivoted adjacent to the gate, and a pawl secured to the lever and adapted to engage the notched wheel, substantially as described.

5. The combination with the flume, the transverse roller journaled thereon and the sliding gate having side slots to fit the roller, of a lever and ratchet mechanism for turning the roller, a locking mechanism for locking the roller and gate, chains secured to the upper and lower portions of the gate and extending around the roller, a second crank roller journaled on the flume in advance of the gate roller, chains extending from the crank roller to the lower portion of the gate, and a pawl and ratchet to lock the crank roller, substantially as described.

6. The combination with the flume, of an inclined gate held therein and adapted to slide upward upon a support, a revoluble roller journaled on the flume in advance of the gate, and a chain connection between the roller and the lower end of the gate, substantially as described.

HERBERT A. CORLISS.

Witnesses:
G. W. COLE,
D. J. SWITZER.